United States Patent
Jarchau et al.

(10) Patent No.: US 6,913,266 B2
(45) Date of Patent: Jul. 5, 2005

(54) SEALING DEVICE

(75) Inventors: Michael Jarchau, Oelde (DE); Egbert Helmig, Ennigerloh (DE); Burkhard Helmig, Beckum (DE)

(73) Assignee: Hammelmann Maschinenfabrik GmbH, Oelde (DE)

( * ) Notice: Subject to any disclaimer, the term of this patent is extended or adjusted under 35 U.S.C. 154(b) by 0 days.

(21) Appl. No.: 10/405,604

(22) Filed: Apr. 3, 2003

(65) Prior Publication Data

US 2003/0189296 A1 Oct. 9, 2003

(30) Foreign Application Priority Data

Apr. 8, 2002 (DE) .......................................... 102 15 311

(51) Int. Cl.⁷ .............................. F16J 15/02; F16J 15/32
(52) U.S. Cl. ........................ 277/500; 277/585; 277/589
(58) Field of Search ................................. 277/527, 534, 277/541, 553, 511–512, 558, 585, 579–580, 589, 504–506

(56) References Cited

U.S. PATENT DOCUMENTS

| | | | |
|---|---|---|---|
| 3,057,630 A | | 10/1962 | Sneed |
| 3,323,806 A | * | 6/1967 | Smith et al. ................. 277/589 |
| 3,601,419 A | | 8/1971 | Fern |
| 3,663,024 A | | 5/1972 | Traub |
| 3,889,958 A | * | 6/1975 | Bennett ....................... 277/556 |
| 3,942,806 A | | 3/1976 | Edlund |
| 4,449,718 A | | 5/1984 | Müller |
| 4,729,569 A | * | 3/1988 | Muller et al. ................ 277/584 |
| 4,936,197 A | * | 6/1990 | Brent ........................... 92/168 |
| 5,101,757 A | | 4/1992 | Schumacher |
| 5,111,736 A | * | 5/1992 | Buchberger et al. ........... 92/168 |
| 5,433,452 A | | 7/1995 | Edlund et al. |
| 5,755,446 A | | 5/1998 | Dean et al. |

FOREIGN PATENT DOCUMENTS

| | | |
|---|---|---|
| DE | 32 25 906 A1 | 1/1984 |
| DE | 41 06 459 A1 | 8/1991 |
| EP | 0 418 732 A1 | 3/1991 |
| EP | 0 670 444 A1 | 9/1995 |
| GB | 2 115 518 | 2/1982 |
| JP | 03249481 | 11/1991 |
| WO | WO 02/08614 A2 | 7/2001 |

* cited by examiner

*Primary Examiner*—Heather Shackelford
*Assistant Examiner*—Vishal Patel
(74) *Attorney, Agent, or Firm*—Barnes & Thornburg

(57) ABSTRACT

A sealing device for a shaft (2) or rod which is movably disposed in a guide arranged between a high-pressure space (10) and a low-pressure area (11) of a pressure-resistant housing (1) bounding the high-pressure space (10), and which is surrounded by a sealing ring (3), is further developed such that the sealing ring (3) is partially deformed by means of a deformable pressure ring (4) supported under pressure at the outer circumference and circumferentially rests against the shaft (2) or the rod or almost rests against the shaft (2) or the rod.

24 Claims, 1 Drawing Sheet

SEALING DEVICE

Figure 1:
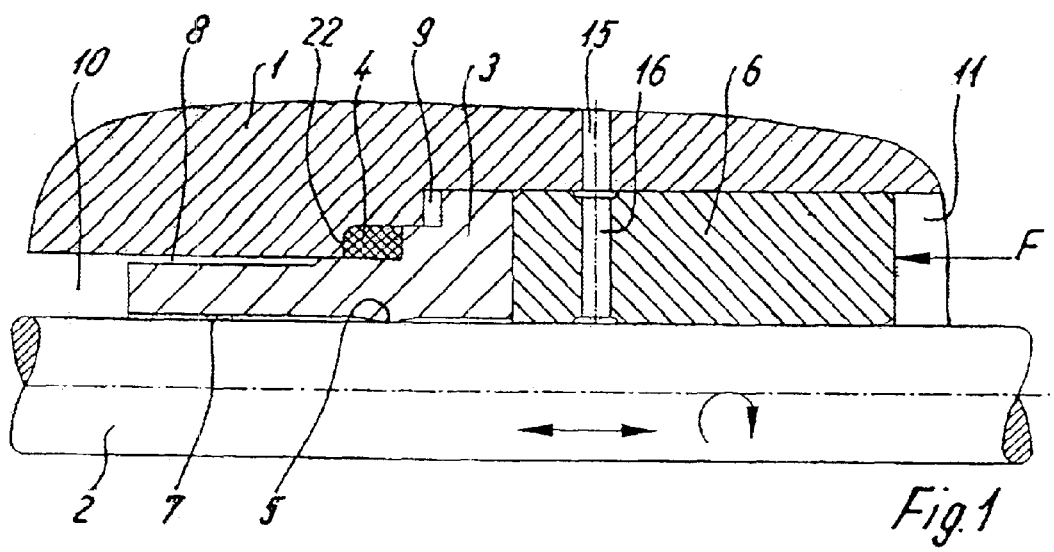

The present invention relates to a sealing device according to preamble of claim 1.

For sealing off a moving shaft or rod in the transition area between a high-pressure space carrying, for example, a liquid medium, and a low-pressure area, it is known to use seals made of thermoplastic or elastomeric materials which, on the one side, rest against the circumference of the shaft and, on the other side, against the housing or parts thereof.

As a result of the high pressures, which in the case of such systems are above 200 bar, as well as a pressure difference in comparison to the low-pressure area resulting therefrom, the rate of motion of the shaft, the temperature and type of the medium to be sealed off, a very high wear of the sealing rings will occur, which leads to a low durability and a correspondingly low service life of the system in which such a sealing device is used. On the whole, the durable reliability of the system is severely restricted.

Furthermore, the described operation-caused wear of the sealing rings and the connected frequent interruptions of the operation naturally result in high costs to which the repair costs are added, so that a sealing device of the above-mentioned type stands in the way of an optimized economic operation.

In order to avoid these disadvantages of the known sealing devices, other sealing solutions consist of providing a sealing ring which reaches around the shaft with a slight circumferential throttling gap. Along the length of this throttling gap, the pressure difference between the high-pressure space and the low-pressure area is reduced.

However, this is connected with a relatively high leakage flow which, also as a result of the flow rate, contributes to an erosion wear by which the throttling gap is enlarged. Finally, this results in unacceptable leakages which have to be eliminated by corresponding repairs.

For eliminating these disadvantages, the throttling gap has to be kept very small which, however, because of the required precision, can be implemented only by means of very high manufacturing expenditures and correspondingly high manufacturing costs. Components of larger dimensions are therefore usually not produced.

It is therefore an object of the present invention to further develop a sealing device of the above-mentioned type in such a manner that a sealing-off is can be implemented which is more resistant to wear and that thereby operating costs as a whole are considerably reduced.

This object is achieved by means of a sealing device which has the characteristics of claim 1.

The sealing ring is expediently formed of a sleeve which preferably consists of hard metal or ceramics and is constructed in the manner of an elevation in the area of the partial deformation. The remaining area of the sealing ring encloses the shaft at a narrow gap distance. Likewise, the sealing ring may also consist of ceramics or hard metal, in each case, in the same composition as the sealing ring or in a different composition than the sealing ring.

Before a mounting of the sealing ring, the latter has a continuously smooth interior wall. Not before the deformable pressure ring is acted upon by a force, the partial deformation in the direction of the shaft will take place as a result of the transmitting deformation forces of the pressure ring. Depending on the applied force, a more or less extensive deformation will take place; that is, a more or less massive construction of the beaded ring, whereby it becomes precisely adjustable how closely this beaded ring rests against the shaft.

Even in the event of a wear of this closely contacting beaded ring caused by the axial and/or rotational movement of the shaft, this wear can be compensated as a result of an adjustment and a further deformation of the pressure ring caused thereby.

The pressure ring itself consists of metal or of a suitable plastic material and, on the other side, is supported on the wall of the pressure-resistant housing which in this respect represents an abutment., The force for deforming the pressure ring and thus for partially deforming the sealing ring can be transmitted by way of a thrust ring and can be generated by screws, threads or a hydraulic system which force is applied to the low-pressure area and is greater than the counterforce resulting from the operating pressure existing in the high-pressure space, the force being freely adjustable.

The elastic transverse deformation, which results in the formation of the above-mentioned beaded ring, reduces the gap between the sealing ring and the shaft which originally existed also in this area, specifically in each case according to the desired demands with respect to the leakage amount, the manufacturing tolerances to be compensated and/or the compensation of the preceding wear. If required, the leakage flows can even be reduced to zero.

Since the sealing ring or the entire sealing device operates almost without wear, naturally considerable advantages are obtained in comparison to the prior art, particularly with respect to the operating costs. An exchange of the sealing ring is also not required after many hours of operation so that the service life of the system into which such a sealing device is installed will be significantly longer with the resulting cost advantages.

Advantageous further developments of the invention are characterized in the subclaims.

Embodiments of the invention will be described in the following by means of the attached drawings.

Figure 2:
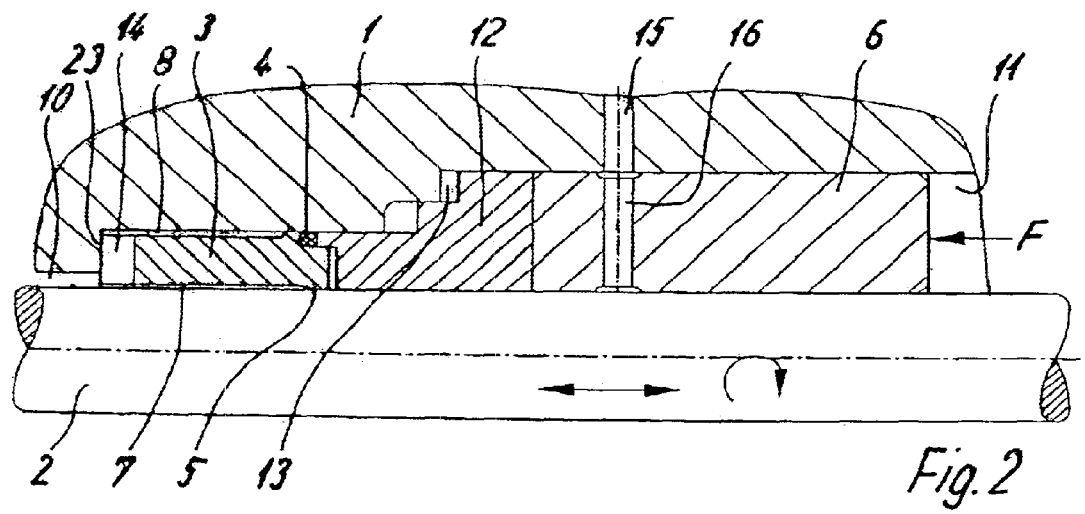
Figure 3:
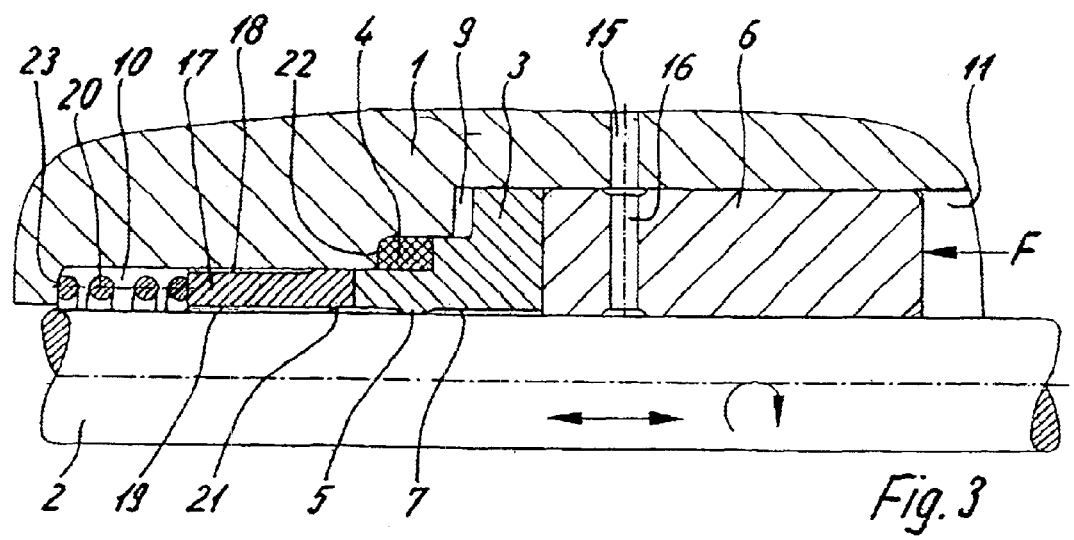

FIGS. 1 to 3 are sectional views of one sealing device respectively.

The figures each show one sealing device respectively for a shaft 2, or as an alternative, a rod, which is movably disposed in a guide arranged between a high-pressure space 10 and a low-pressure area 11 of a housing 1 bounding the high-pressure space 10. The shaft 2 may be movable back and forth in the axial direction as well as rotating or swiveling.

The sealing device has a sealing ring 3 which preferably consists of hard metal or ceramics, is constructed as a sleeve and surrounds the shaft 2, the inside diameter of the sealing ring 3 being essentially slightly larger than the diameter of the shaft 2, so that an interior gap 7 is formed.

A pressure ring 4 forming a static seal rests against a portion of the outer jacket of the sealing ring 3, which pressure ring 4 is deformable and may consist of metal or of a plastic material. On the other side, this pressure ring 4 is supported on the wall of the pressure-resistant housing 1, in which case it rests in a receiving device 22 in the example shown in FIGS. 1 and 3.

By way of a spacer ring 6 acting as the thrust ring, a force F originating from the low-pressure area 11 is applied in the axial direction, so that the pressure ring 4 deforms, in which case it is held in an expansion-resistant manner by three sides of the receiving device 22, which sides are formed, on the one hand, by the wall of the housing 1 and, on the other hand, by a step-shaped projection of the sealing ring 3 (FIGS. 1 and 3). In the housing 1 and the spacer ring 6, feeding bores 15, 16 are provided by means of which liquid can be entered between the spacer ring 6 and the shaft 2 for cooling and lubrication.

A receiving space in which the pressure ring 4 is placed and which is comparable with the receiving device 22, in the case of the embodiment illustrated in FIG. 2, in addition to the sealing ring 3 and the wall of the housing 1, is bounded by a front surface of a thrust piece 12 which is arranged between the sealing ring 3 and the spacer ring 6 and encloses the shaft 2 in a ring shape.

When the force F is applied, the deformation forces acting upon the pressure ring 4 are radially guided in the direction of the shaft 2, causing a partial deformation while forming a beaded ring 5 on the interior wall of the sealing ring 3, which partial deformation, depending on the applied force F, has the result that this beaded ring 5 rests against this shaft 2 or almost rests against this shaft 2.

In the case of the embodiment illustrated in FIG. 1, the sealing ring 3 is axially displaced by pressure onto the spacer ring 6, in which case the sealing ring experiences a pretensioning by the axial reduction of a chamber 9 adjacent to the housing 1. In this case, the force F is greater than the product of the pressure of the medium in the high-pressure space 10 and the ring surface of the sealing ring 3 acted upon by pressure in the high-pressure space 10 minus the pressure in the low-pressure area 11 multiplied by the effective ring surface of the spacer ring 6.

Depending on the adjustment of the force F by way of screws, threads or hydraulic devices, the beaded ring 5 moves more or less closer to the shaft 2. In this case, the beaded ring 5 may even exercise a certain compressive stress upon the shaft 2.

While, in the embodiments according to FIGS. 1 and 3, the sealing ring 3 is disposed in an axially displaceable manner, in the embodiment illustrated in FIG. 2, it is fixedly positioned; that is, it is supported on the base of a shoulder 23, while it carries the pressure ring 4 on the opposite end. In this case, the shaping-out toward the beaded ring 5 also takes place as described above by way of the spacer ring 6 but indirectly, because the thrust piece 12 is arranged between the sealing ring 3 and the spacer ring 6.

An expansion of the interior gap 7 of the sealing body 3 because of the internal pressure and a resulting decrease of the sealing effect of the beaded ring 5 is prevented by an exterior gap 8 which is formed in that the outside diameter of the sealing ring 3 in a length region essentially projecting into the high-pressure space 10 is smaller than the inside diameter of the high-pressure space 10.

This exterior gap 8 is connected with the high-pressure space 10, so that the same pressure as in the high-pressure space 10 exists in the interior gap 7, which is also connected with the high-pressure space 10, and the exterior gap 8.

In the embodiment illustrated in FIG. 2, the connection between the high-pressure space 10 and the exterior gap 8 is established by radial grooves 14 which are provided in the sealing ring 3 on the front side of the sealing ring 3 which is supported on the shoulder 23 of the housing 1.

In addition, as a result of the interior gap 7, a throttling and thus a partial reduction of the pressure takes place so that a lower pressure exists at the sealing area formed by the beaded ring 5 than in the high-pressure space 10.

The embodiment according to FIG. 2, in which the sealing ring 3 rests firmly against the shoulder 23 in the direction of the force F and the force F is applied by way of the thrust piece 12 to the pressure ring 4, has the advantage of a better adjustability particularly in the case of greater lengths of the sealing device. Furthermore, different materials which are optimal for the respective function can be used for the sealing ring 3 and the thrust piece 12.

In the case of the sealing device illustrated in FIG. 3, the sealing ring 3 is relatively short in comparison with that in FIG. 1. Here, the throttling of the pressure takes place by way of a sleeve 17, the sealing body 3 resting against one front side of the sleeve 17 and the sleeve 17 having a bevel 21 on its side facing the sealing body 3, as a lengthening of the interior gap 19, which bevel 21 causes a related increase of the axial contact tension which is higher than the pressure in the high-pressure space 8. A sealing effect is thereby generated which prevents a pressure compensation between an exterior gap 18 open in the direction of the high-pressure space 10 and the interior gap 19, the exterior gap 18 being shorter than interior gap 19 which in this respect extends along the entire length of the sleeve 17.

In order to generate an initial pretensioning, a pressure spring 20 is provided which, on one side, is supported on the shoulder 23 of the housing 1 and, on the other side, is supported on the front side of the sleeve 17 facing away from the sealing ring 3.

List of Reference Numbers

1 Housing
2 shaft
3 sealing ring
4 pressure ring
5 beaded ring
6 spacer ring
7 interior gap
8 exterior gap
9 chamber
10 high-pressure space
11 low-pressure area
12 thrust piece
13 chamber
14 radial groove
15 feeding bore
16 feeding bore
17 stop sleeve
18 gap
19 gap
20 pressure spring
21 bevel
22 receiving device
23 shoulder

What is claimed is:

1. A sealing device for a movable shaft arranged between a high-pressure space and a low-pressure area of a pressure-resistant housing that bounds the high pressure space, the sealing device comprising:
    a deformable pressure ring;
    a sealing ring surrounding the shaft and being partially deformed by the deformable pressure ring which pressure ring is supported under pressure at an outer circumference of the sealing ring, at least a portion of the sealing ring resting against the shaft; and
    wherein a force originating from the low-pressure area is applied to deform the sealing ring via a thrust ring located in the low-pressure area.

2. The sealing device according to claim 1, wherein a pressure acting upon one or more of the pressure ring and the sealing ring is adjustable.

3. The sealing device according to claim 1, wherein the sealing ring is spaced by a narrow distance from the shaft and forming an interior gap.

4. The sealing device according to claim 3, wherein the partial deformation of the sealing ring forms a beaded ring in an area of the interior gap.

5. The sealing device according to claim 1, wherein the sealing ring is constructed as a sleeve.

6. The sealing device according to claim 1, wherein the pressure ring is deformed by pressure applied through the sealing ring.

7. The sealing device according to claim 1, wherein the pressure ring rests in a receiving device of the housing.

8. The sealing device according to claim 1, wherein the sealing ring is disposed around the shaft in an axially-displaceable manner.

9. The sealing device according to claim 1, wherein the thrust ring is a spacer ring.

10. The sealing device according to claim 1, wherein the force is applied by one or more of screws, threads and hydraulics.

11. The sealing device according to claim 1, wherein an exterior gap is formed between the sealing ring and an adjacent wall of the housing, and the exterior gap being connected with the high-pressure space.

12. The sealing device of claim 3, wherein an exterior gap is formed between the sealing ring and an adjacent wall of the housing, the exterior gap and the interior gap being connected to the high-pressure space.

13. The sealing device according to claim 1, wherein the pressure ring is made of one or more of metal and plastic material.

14. The sealing device according to claim 1, wherein the sealing ring is made of one or more of hard metal and ceramics.

15. The sealing device of claim 1, wherein the shaft is made of one or more of one or more of hard metal and ceramics.

16. The sealing device according to claim 1, wherein when the sealing ring is loaded by the force, one side of the sealing ring rests against a shoulder of the housing.

17. The sealing device according to claim 16, wherein in a contact area of the sealing ring with the shoulder, radial grooves are provided by which a connection is established between an exterior gap formed between the sealing ring and an adjacent wall of the housing and the high-pressure space.

18. The sealing device according to claim 1, wherein the pressure ring is deformable by a thrust piece axially guided on the shaft, the pressure ring being supported on the sealing ring and by a wall of the housing.

19. The sealing device according to claim 18, wherein the thrust piece is arranged between a spacer ring and the sealing ring.

20. The sealing device according to claim 1, wherein one side of the sealing ring rests against a front side of a sleeve, which sleeve, on its other side, supports a pressure spring that rests on a shoulder of the housing.

21. The sealing device according to claim 20, wherein an interior gap is formed between the shaft and the sleeve, which interior gap expands in the form of a bevel in an end area of the sleeve facing the sealing ring, and which interior gap extends along an entire length of the sleeve.

22. The sealing device according to claim 20, wherein an exterior gap is formed between the sleeve and a wall of the housing, which exterior gap is open toward the high-pressure space and extends along a partial length of the sleeve.

23. The sealing device according to claim 1, wherein feeding bores are provided in the housing and the thrust ring, through which feeding bores liquid can be entered between the thrust ring and the shaft for cooling and lubrication.

24. A sealing device for a movable shaft arranged between a high pressure space and a low pressure area of a pressure resistant housing that bounds the high pressure space, the sealing device comprising:

a deformable pressure ring;

a sealing ring surrounding the shaft and being partially deformed by the deformable pressure ring by a force originating from the low-pressure area, which pressure ring is supported under pressure at an outer circumference of the sealing ring, the sealing ring resting against the shaft; and wherein the pressure ring is deformable by a thrust piece axially guided on the shaft, the pressure ring being supported on the sealing ring and by a wall of the housing.

* * * * *